US012621295B2

(12) United States Patent
Sharma

(10) Patent No.: US 12,621,295 B2
(45) Date of Patent: May 5, 2026

(54) METHODS, SYSTEMS AND COMPUTER PROGRAM PRODUCTS FOR SECURE REMOTE HARDWARE ACCESS THROUGH CROSS-DEVICE AUTHENTICATION

(71) Applicant: NOW.GG, INC., Campbell, CA (US)

(72) Inventor: Rosen Sharma, Monte Sereno, CA (US)

(73) Assignee: Now.GG, Inc., Campbell, CA (US)

( * ) Notice: Subject to any disclaimer, the term of this patent is extended or adjusted under 35 U.S.C. 154(b) by 222 days.

(21) Appl. No.: 17/686,921

(22) Filed: Mar. 4, 2022

(65) Prior Publication Data

US 2022/0286456 A1 Sep. 8, 2022

Related U.S. Application Data

(60) Provisional application No. 63/156,471, filed on Mar. 4, 2021.

(51) Int. Cl.
*H04L 9/40* (2022.01)
*H04L 9/32* (2006.01)

(52) U.S. Cl.
CPC ........ *H04L 63/0876* (2013.01); *H04L 9/3213* (2013.01); *H04L 63/083* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,218,506 B1 | 2/2019 | Bhabbur et al. | |
| 2010/0083386 A1* | 4/2010 | Kline | G06F 21/33 |
| | | | 726/34 |
| 2012/0317622 A1 | 12/2012 | Harjanto et al. | |
| 2014/0157392 A1 | 6/2014 | Smith et al. | |
| 2016/0277374 A1 | 9/2016 | Reid et al. | |
| 2016/0342784 A1* | 11/2016 | Beveridge | G06F 21/34 |
| 2020/0287894 A1* | 9/2020 | Leon | H04L 9/3213 |
| 2021/0051012 A1 | 2/2021 | Law | |
| 2021/0385214 A1* | 12/2021 | Jain | H04L 63/0876 |
| 2022/0150066 A1* | 5/2022 | Sugarev | H04L 9/3213 |

* cited by examiner

*Primary Examiner* — Ario Etienne
*Assistant Examiner* — Mohammad Yousuf A. Mian
(74) *Attorney, Agent, or Firm* — The Webb Law Firm

(57) ABSTRACT

The present invention relates to cross-device authentication technologies. In particular, the present invention relates to methods, systems and computer program products for enabling cross-device authentication, including for implementation within cloud based service systems, and even more particularly for implementation within cloud gaming systems.

13 Claims, 9 Drawing Sheets

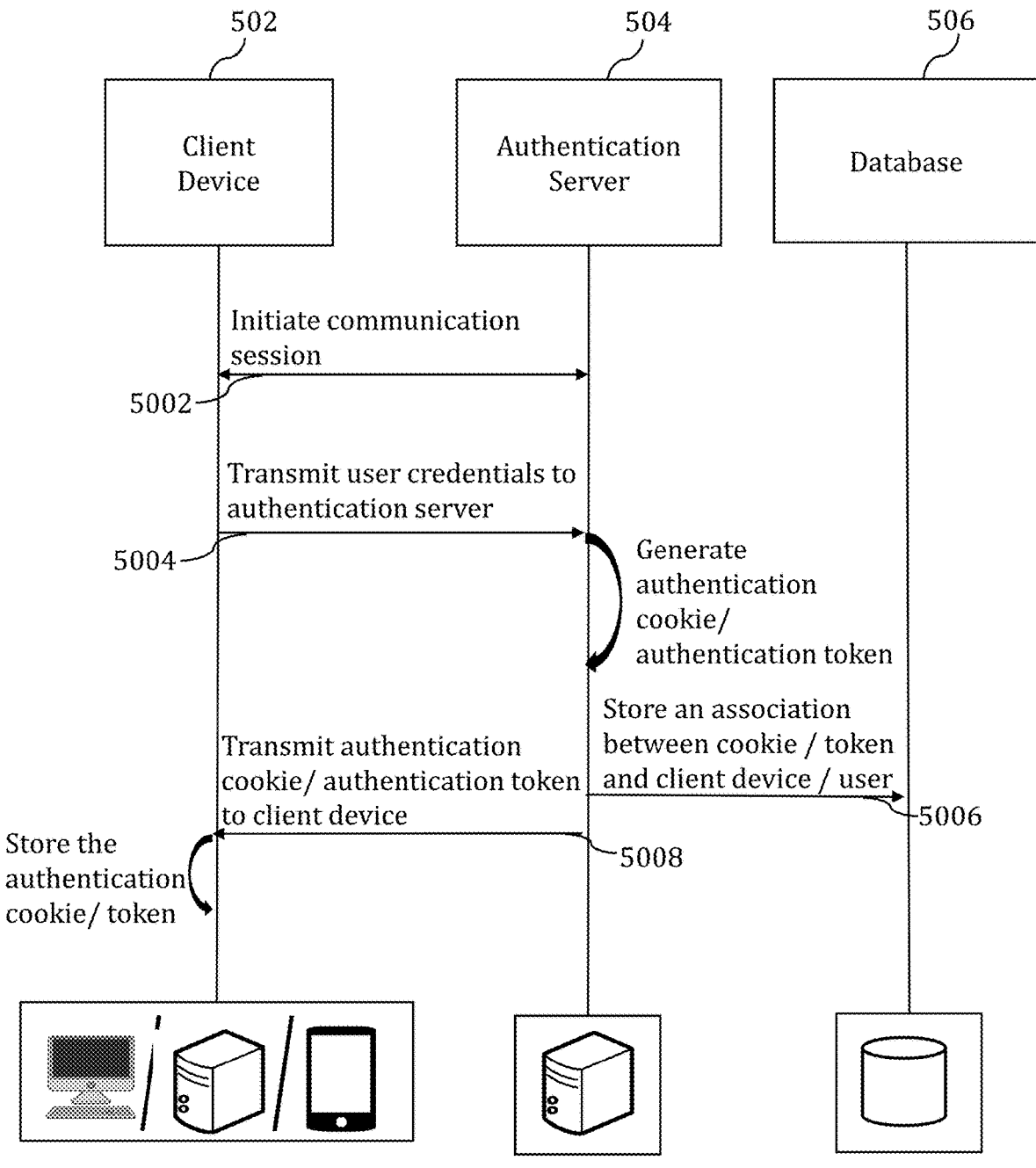

502

504

506

Client
Device

Authentication
Server

Database

Initiate communication
session

5002

Transmit user credentials to
authentication server

5004

Generate
authentication
cookie/
authentication token

Store an association
between cookie / token
and client device / user

Transmit authentication
cookie/ authentication token
to client device

5006

5008

Store the
authentication
cookie/ token

Figure 5

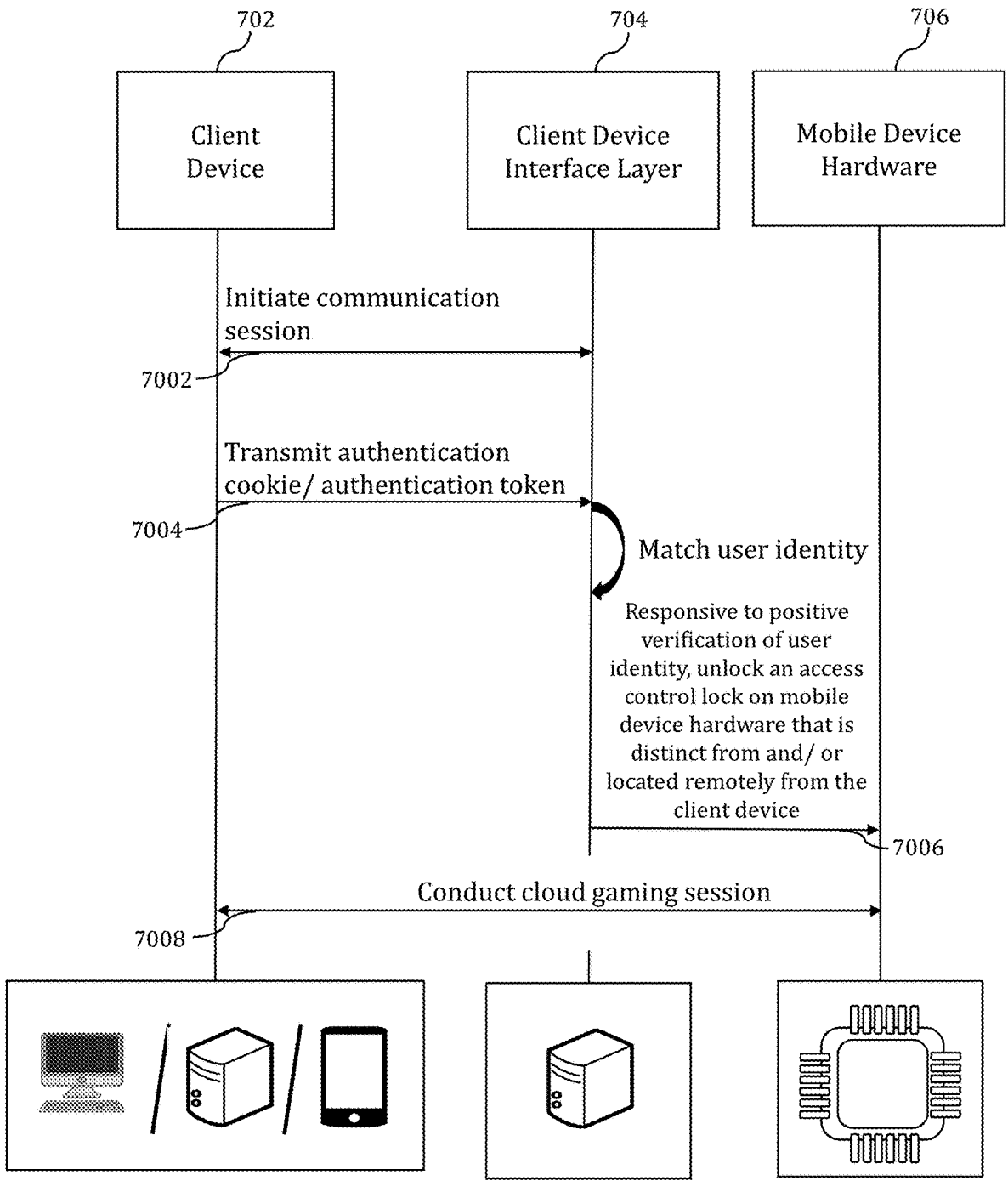

702

Client
Device

704

Client Device
Interface Layer

706

Mobile Device
Hardware

Initiate communication
session

7002

Transmit authentication
cookie/ authentication token

7004

Match user identity

Responsive to positive
verification of user
identity, unlock an access
control lock on mobile
device hardware that is
distinct from and/ or
located remotely from the
client device

7006

Conduct cloud gaming session

METHODS, SYSTEMS AND COMPUTER PROGRAM PRODUCTS FOR SECURE REMOTE HARDWARE ACCESS THROUGH CROSS-DEVICE AUTHENTICATION

CROSS-REFERENCE TO RELATED APPLICATION

This application claims priority to U.S. Provisional Application No. 63/156,471 filed Mar. 4, 2021, the disclosure of which is hereby incorporated by reference in its entirety.

FIELD OF THE INVENTION

The present invention relates to remote hardware access through cross-device authentication. In particular, the present invention provides methods, systems and computer program products for enabling secure remote hardware access through cross-device authentication, including for implementation with cloud based services systems, and even more particularly for implementation within cloud gaming systems.

BACKGROUND

With the increase in availability of affordable computing hardware, it has become commonplace for individuals to use a plurality of computing devices or data processing devices for accessing cloud based, or network based, services.

It has however been found that session instantiation with each computing device requires prior authentication of an identity of a user, or authentication of an identity of a client device that is requesting session instantiation. The identity authentication process ordinarily involves some form of call-response challenge—for example, providing a user name and password to enable identity authentication. Going through an identity authentication process for every instance of session instantiation is tedious, and provides a poor user experience.

There is accordingly a need for a solution that enables secure and convenient identity authentication without interfering with the overall user experience.

SUMMARY

The invention provides remote hardware access through cross-device authentication. In particular, the present invention provides methods, systems and computer program products for enabling secure remote hardware access through cross-device authentication, including for implementation with cloud based services systems, and even more particularly for implementation within cloud gaming systems.

The invention provides a method for enabling secure remote hardware access through cross-device authentication. The method comprises the steps of (i) establishing network communication between a client device and a remotely located cloud services server over a communication network, (ii) receiving at the cloud services server, a client device authentication token transmitted from the client device, wherein the client device authentication token is retrieved from a memory within or coupled with the client device, (iii) comparing the received client device authentication token with authentication token data stored in a database of pre-authorized authentication tokens corresponding to one or more client devices or users that are pre-authorized for remote access to a hardware device that is protected by an access control lock, wherein the hardware device is distinct from the client device, (iv) responsive to a positive match between the received client device authentication token and a pre-authorized authentication token (a) unlocking the access control lock on the hardware device, and (b) providing to the client device over the communication network, one or more cloud based software services implemented by the hardware device.

In an embodiment of the method, the client device authentication token has been provisioned in the memory within or coupled with the client device prior to the step of establishing network communication between the client device and the remotely located cloud services server, by implementing the steps of (i) receiving at a remote server, user credentials transmitted from the client device, wherein the user credentials comprises data that includes one or more identifiers corresponding to at least one of the client device or a user of the client device, (ii) generating an authentication token and associating the authentication token with the client device or the user of the client device, (iii) storing within the database of pre-authorized authentication tokens, the generated authentication token, and (iv) transmitting the generated authentication token to the client device for storage in the memory within or coupled with the client device.

The method may in an embodiment further comprise the step of storing within the database of pre-authorized authentication tokens: (i) data associating the generated authentication token with the client device or with the user of the client device, or (ii) data identifying the generated authentication token as being pre-authorized for remote access to the hardware device.

In a specific embodiment of the method, the client device authentication token is retrieved for transmission to the cloud services server, from the memory within or coupled with the client device, in response to initiation of a request for enabling the client device to access a software streaming service provided by the cloud services server.

In one embodiment of the method, the hardware device is a mobile communication device, or a processor based circuit board that is configured to implement functionality of a mobile communication device, or a data processor based system that is configured to implement functionality of a mobile communication device, and wherein the mobile communication device, the processor based circuit board or the data processor based system is distinct from and remotely located from the client device.

In a particular method embodiment, the access control lock is a screen lock on a mobile communication device, or on a data processor based system that is configured to implement functionality of a mobile communication device, and wherein the mobile communication device or the data processor based system is distinct from and remotely located from the client device.

The invention additionally provides a system for enabling secure remote hardware access through cross-device authentication. The system comprise a cloud services server configured for (i) establishing network communication with a client device located remotely from the cloud services server, (ii) receiving a client device authentication token transmitted from the client device, wherein the client device authentication token is retrieved from a memory within or coupled with the client device, (iii) comparing the received client device authentication token with authentication token data stored in a database of pre-authorized authentication tokens corresponding to one or more client devices or users that are pre-authorized for remote access to a hardware device that is protected by an access control lock, wherein the hardware device is distinct from the client device, (iv) responsive to a positive match between the received client device authentication token and a pre-authorized authentication token (a) unlocking the access control lock on the hardware device, and (b) providing to the client device over the communication network, one or more cloud based software services implemented by the hardware device.

In an embodiment of the system, the client device authentication token has been provisioned in the memory within or coupled with the client device by: (i) receiving at a remote server, user credentials transmitted from the client device, wherein the user credentials comprises data that includes one or more identifiers corresponding to at least one of the client device or a user of the client device, (ii) generating an authentication token and associating the authentication token with the client device or the user of the client device, (iii) storing within the database of pre-authorized authentication tokens, the generated authentication token, and (iv) transmitting the generated authentication token to the client device for storage in the memory within or coupled with the client device.

In an embodiment of the system, the database of pre-authorized authentication tokens includes (i) data associating the generated authentication token with the client device or with the user of the client device, or (ii) data identifying the generated authentication token as being pre-authorized for remote access to the hardware device.

In a system embodiment, the client device authentication token is retrieved for transmission to the cloud services server, from the memory within or coupled with the client device, in response to initiation of a request for enabling the client device to access a software streaming service provided by the cloud services server.

In another embodiment of the system, the hardware device is a mobile communication device, or a processor based circuit board that is configured to implement functionality of a mobile communication device, or a data processor based system that is configured to implement functionality of a mobile communication device, and wherein the mobile communication device, the processor based circuit board or the data processor based system is distinct from and remotely located from the client device.

In a particular embodiment of the system, the access control lock is a screen lock on a mobile communication device, or on a data processor based system that is configured to implement functionality of a mobile communication device, and wherein the mobile communication device or the data processor based system is distinct from and remotely located from the client device.

The invention also provides a computer program product for enabling secure remote hardware access through cross-device authentication. The computer program product comprises a non-transitory computer readable medium having a computer readable program code embodied therein, the computer readable program code comprising instructions for implementing the steps of (i) establishing network communication between a client device and a remotely located cloud services server over a communication network, (ii) receiving at the cloud services server, a client device authentication token transmitted from the client device, wherein the client device authentication token is retrieved from a memory within or coupled with the client device, (iii) comparing the received client device authentication token with authentication token data stored in a database of pre-authorized authentication tokens corresponding to one or more client devices or users that are pre-authorized for remote access to a hardware device that is protected by an access control lock, wherein the hardware device is distinct from the client device, (iv) responsive to a positive match between the received client device authentication token and a pre-authorized authentication token (a) unlocking the access control lock on the hardware device, and (b) providing to the client device over the communication network, one or more cloud based software services implemented by the hardware device.

BRIEF DESCRIPTION OF THE ACCOMPANYING DRAWINGS

FIG. 5 is a communication flow diagram illustrating communication flow between system entities involved in implementing the method of FIG. 4.

FIG. 7 is a communication flow diagram illustrating communication flow between system entities for implementing a preferred embodiment of the method of FIG. 6.

DETAILED DESCRIPTION

The invention provides remote hardware access through cross-device authentication. In particular, the present invention provides methods, systems and computer program products for enabling secure remote hardware access through cross-device authentication, including for implementation with cloud based services systems, and even more particularly for implementation within cloud gaming systems.

Figure 1:
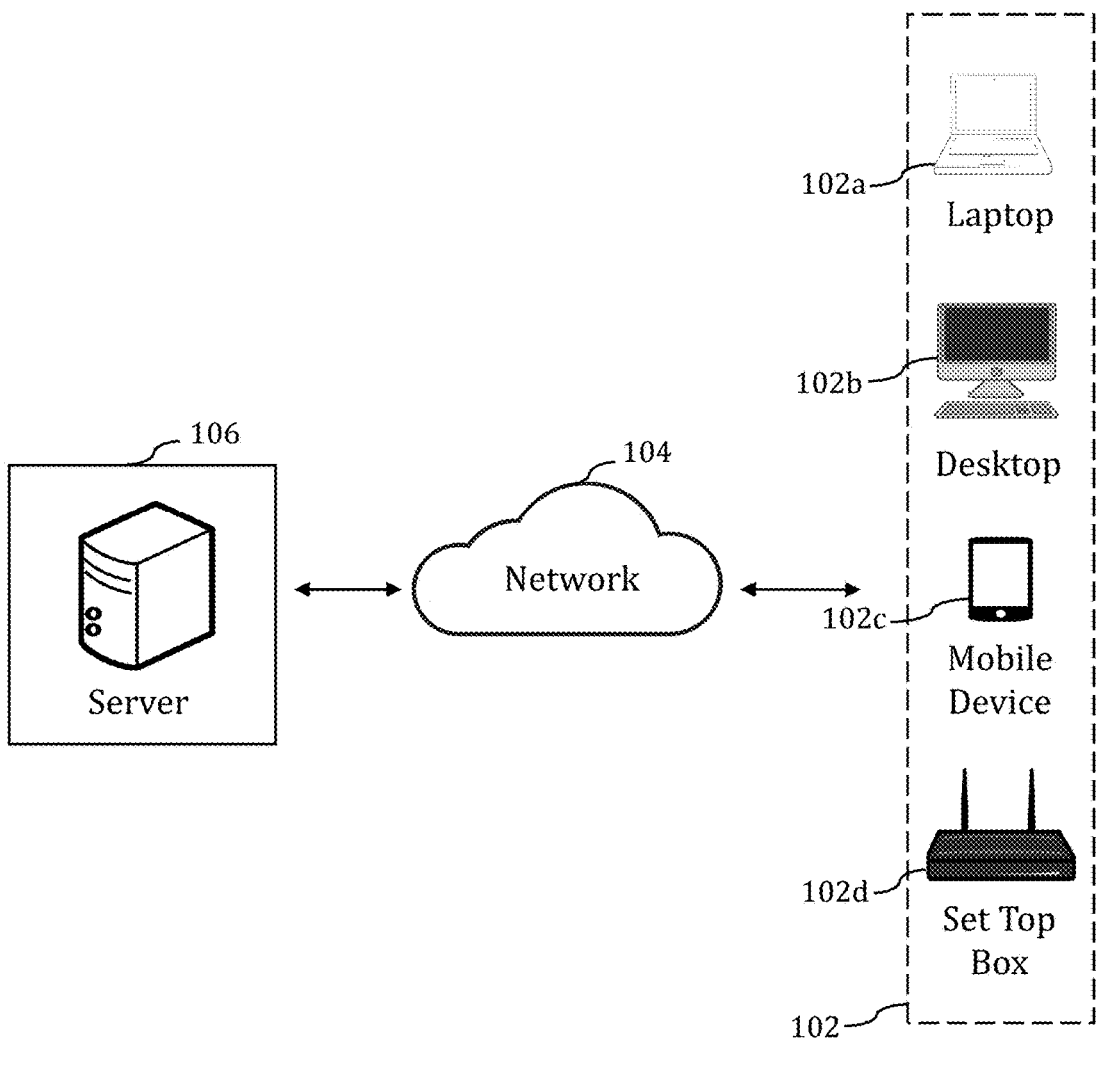
FIGS. 1 and 2 illustrate system environments of a kind that may be used to implement the teachings of the present invention.

The method of the present invention may be implemented within a system environment 100 of a kind illustrated in FIG. 1. System environment 100 comprises one or more client devices 102 (for example, any of laptop 102a, desktop 102b, mobile device 102c and/or set top box 102d) interfacing through network 104, with a server 106. The server 106 may be configured to support a conventional server-client arrangement, where the client device 102 may communicate with server 106 for any one or more of several purposes, including for example downloading a software application, configuring the downloaded software application, updating the downloaded software application, or enabling client device 102 to upload or download data.

Alternatively, server 106 may be configured to provide cloud based service(s) to a requesting client device 102, wherein a software application required by client device 102 is installed and run on server 106, and video and audio output data from the software application is streamed to and rendered on client device 102. The inputs received from a user or operator of the client device 102 are in turn transmitted back to server 106 and are used to control execution of the software application that is running on the server 106.

So for example, in a cloud based gaming environment, a game software is installed and run on a hardware device configured to run the game software—and which is integrated or coupled with server 106. The game software is run on the hardware device and video and audio gameplay data is streamed from the hardware device (optionally through server 106) to a client device 102, where it is rendered for display and/or audio playback. A gameplayer who is operating client device 102 uses the interface controls of client device 102 to provide gameplay inputs—which are streamed back to the hardware device on which the game software is being executed and is used as gameplay control inputs for the game software that is being run on said hardware device.

The present invention provides methods and systems that are capable of being implemented within a cloud based services environment for enabling secure user access from a client device to a remotely located hardware devices—wherein the remotely located hardware device is running a software application that is streaming software application output data to the client device.

Implementation of the present invention relies on a two-step process comprising:

provisioning a client device with an authentication cookie or an authentication token for enabling secure user access to a remotely located hardware device (explained in more detail in connection with FIGS. 2 and 3), and instantiating a communication session with the remotely located hardware device based on verification of the authentication cookie or authentication token provisioned within the client device (explained in more detail in connection with FIGS. 4 and 5).

Figure 2:
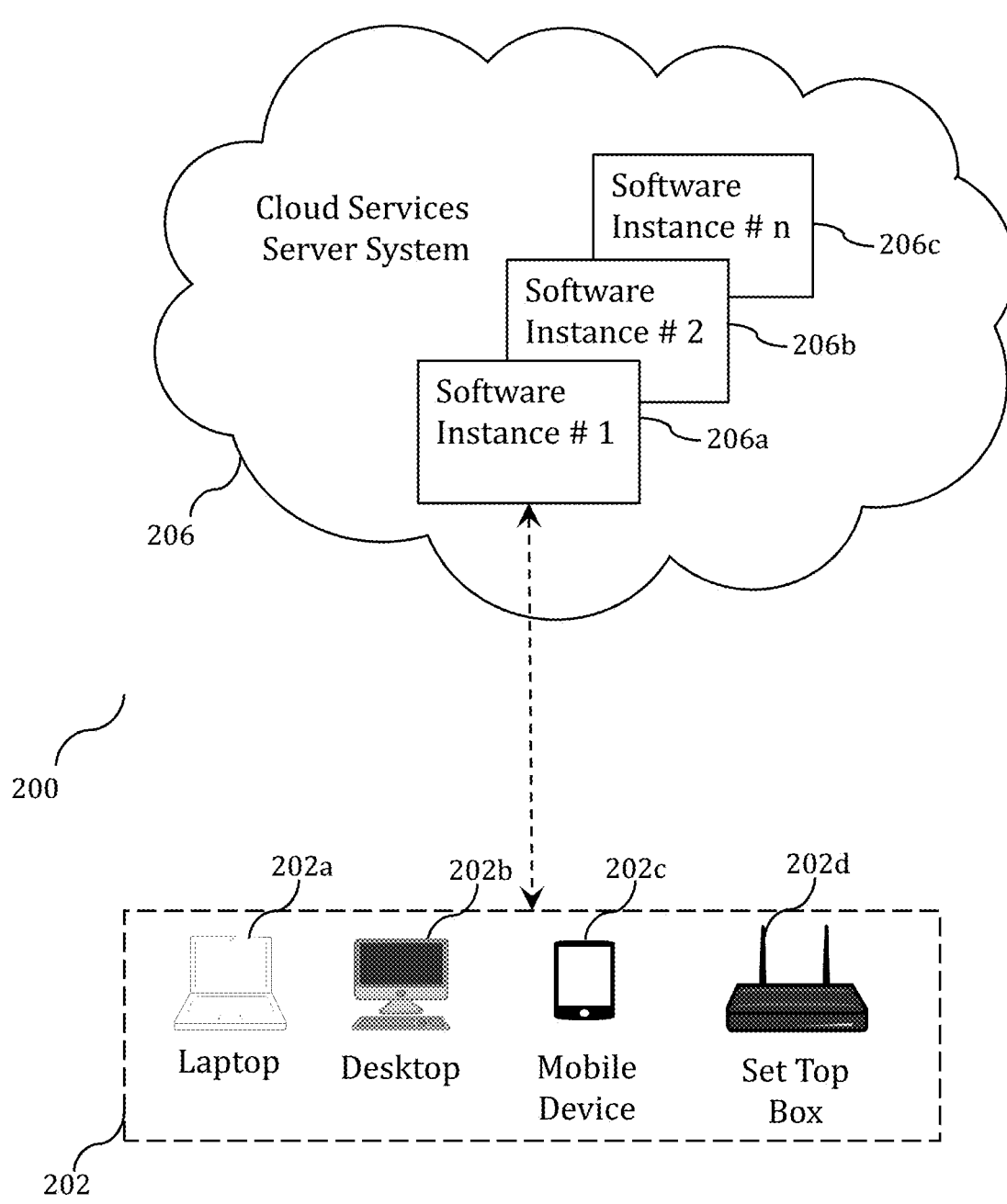

Each of the above two steps may be implemented within a system environment 200 of the kind illustrated in FIG. 2.

System environment 200 comprises one or more client devices 202 (for example, any of laptop 202a, desktop 202b, mobile device 202c and/or set top box 202d) interfacing through a communication network such as a data network or the internet (not shown), with a cloud services server system 206. The cloud services server system 206 may comprise (or may be coupled with) a plurality of discrete or distinct hardware systems—each of which is configured to be provisioned with, and to instantiate and run a discrete instance of one or more software applications. In an embodiment, the cloud services server system 206 may comprise at least a cloud services server. The cloud services server system 206 may utilize the plurality of discrete or distinct hardware systems therewithin to simultaneously run software instance #1 (206a), software instance #2 (206b), upto software instance #n (206c)—such that video and/or audio data from each of these software instances 206a to 206c may be streamed to one or more requesting client devices 202a to 202d.

By way of an example:

client device 202a may request cloud services server system 206 for cloud based execution of a first software application—and cloud services server system 206 may respond by (i) instantiating a first instance of this first software application to run on a first hardware system, and (ii) streaming video and/or audio data from the first instance of the first software application to client device 202a.

client device 202b may request cloud services server system 206 for cloud based execution of a second software application (which may be the same as the first software application, or may comprise a different software application)—and cloud services server system 206 may respond by (i) instantiating a second instance of this second software application to run on a second hardware system, and (ii) streaming video and/or or audio data from the second instance of the second software application to client device 202a client device 202c may request cloud services server system 206 for cloud based execution of an $n^{th}$ software application (which may be the same as either of the first or second software applications, or may be different from both)—and cloud services server system 206 may respond by (i) instantiating an $n^{th}$ instance of this $n^{th}$ software application to run on an $n^{th}$ hardware system, and (ii) streaming video and/or audio data from the $n^{th}$ instance of the $n^{th}$ software application to client device 202c.

Figure 3:
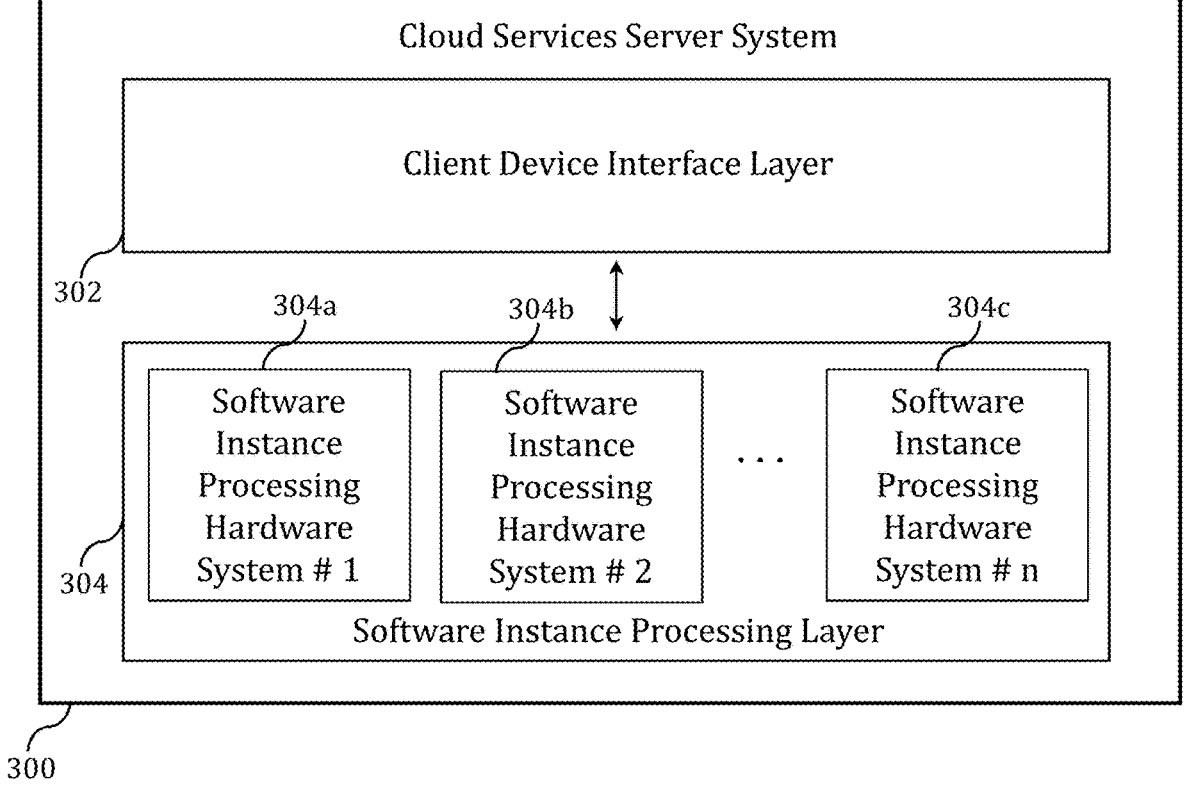
FIG. 3 illustrates an exemplary configuration for a cloud services server system in accordance with the teachings of the present invention.

FIG. 3 illustrates an exemplary cloud services server system 300 of the kind more generally described in connection with system environment 200 of FIG. 2 (i.e. cloud services server system 206 of FIG. 2).

As shown in FIG. 3, cloud services server system 300 may comprise a client device interface layer 302, and software instance processing layer 304, wherein the two layers are communicably interfaced with each other.

Client device interface layer 302 may comprise an interface layer implemented on one or more servers (or one or more other data processing systems) and configured for implementing one or more of:

Receiving a request for instantiation of a software instance for providing a cloud based software service to a client device.

authenticating a client device or a user that is requesting instantiation of a software instance.

responding to a request from a client device by instantiating a requested software instance on a hardware system within the software instance processing layer 304.

establishing and/or controlling a data communication session between a client device and a hardware system on which a software instance is being executed for the purposes of providing a cloud based software service to the client device.

Software instance processing layer 304 comprises a plurality of hardware systems. In system environment 300 of FIG. 3, software instance processing layer 304 comprises a plurality of software instance processing hardware systems #1 to #n (304a, 304b, 304c), each of which is configured to:

enable a software application (that is intended to be made available to client devices by way of cloud services) to be installed thereon.

responsive to receiving a request for executing an instance of a software application thereon, instantiating the requested instance of the software application for providing a cloud based software service to a client device.

streaming to a client device, video output data and/or audio output data from an instance of a software application that is being executed on the software instance processing hardware system.

receiving from a client device, user input or control instructions for controlling an instance of a software application that is being executed on the software instance processing hardware system.

controlling an instance of a software application that is being executed on the software instance processing hardware system, based on user input or control instructions received from the client device.

Returning to the example of a cloud based gaming environment, the cloud services server system 300 of FIG. 3 may be configured such that each of the plurality of software instance processing hardware systems #1 to #n (304a, 304b, 304c) are configured for gaming software application(s) to be installed and executed thereon. When an instance of a gaming software application is run on any of the software instance processing hardware systems #1 to #n (304a, 304b, 304c), video and audio gameplay data is streamed from such software instance processing hardware system to a client device, where it is rendered for display and/or audio playback. A gameplayer who is operating the receiving client device uses the interface controls of the client device to provide gameplay inputs—which are streamed back to the executing software instance processing hardware system, and are used as gameplay control inputs for the instance of the gaming software that is being run on the executing software instance processing hardware system.

Figure 8A:
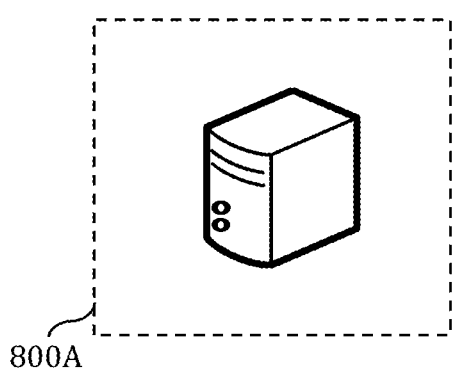
FIGS. 8A to 8C illustrate exemplary embodiments of software instance processing hardware systems of the kind illustrated generally in FIG. 3.
Figure 8B:
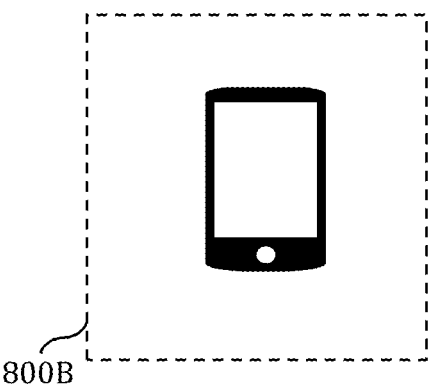
Figure 8C:
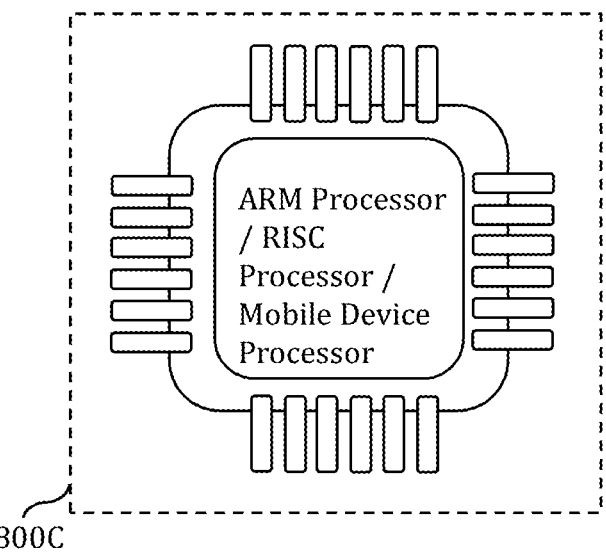

Each of the software instance processing hardware systems #1 to #n (304a to 304c) may comprise any data processing system, including any of a central processing unit (CPU), or a server 800A (see FIG. 8A), or any component thereof having software application execution capabilities, or a mobile communication device 800B (see FIG. 8B) or any component thereof having software application execution capabilities, or an ARM (Advanced RISC Machine) processor/RISC (Reduces Instruction Set Computing) processor/mobile device processor 800C (see FIG. 8C) or any hardware component that includes any such processor and has software application execution capabilities.

As discussed briefly above, implementation of the invention relies on (i) provisioning a client device with an authentication cookie or an authentication token for enabling secure user access to a remotely located hardware device (explained in more detail in connection with FIGS. 4 and 5), and (ii) instantiating a communication session with the remotely located hardware device based on the verification of the authentication cookie or authentication token provisioned within the client device (explained in more detail in connection with FIGS. 4 and 5).

Figure 4:
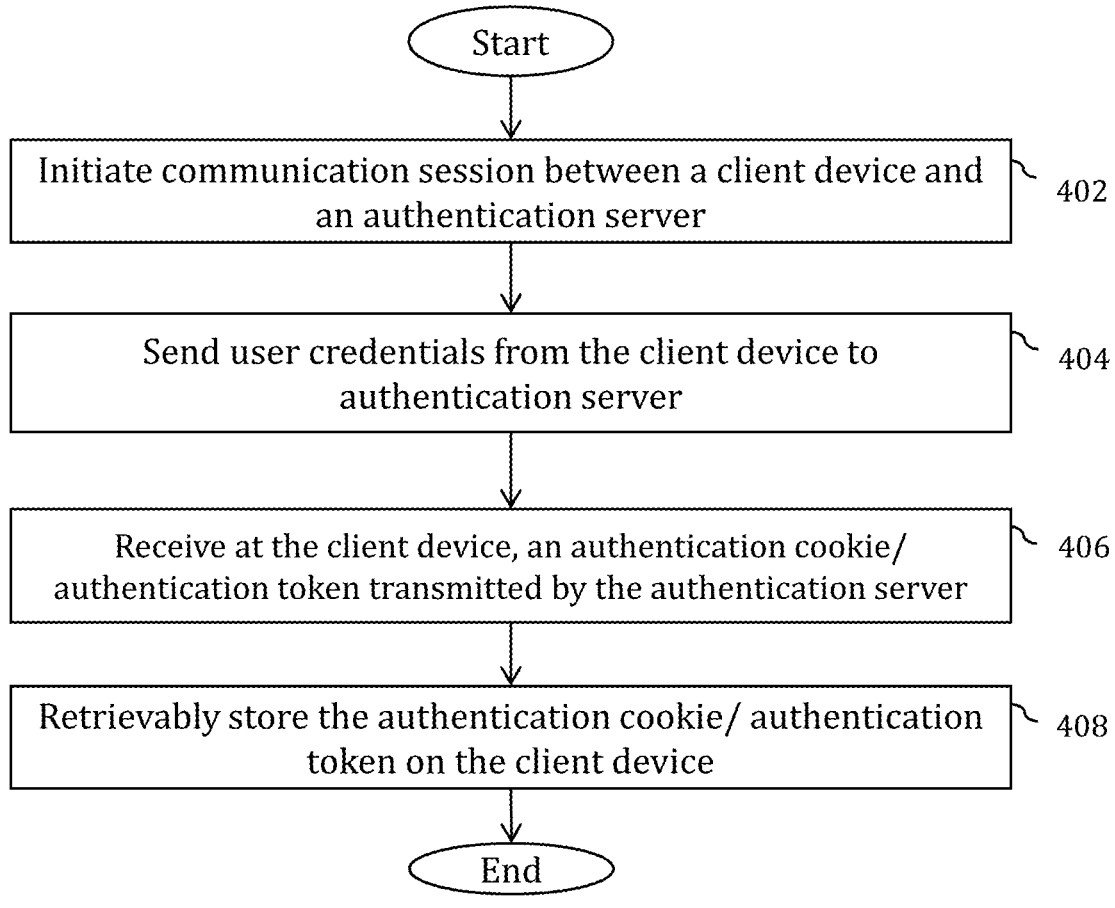
FIG. 4 is a flowchart illustrating method steps involved in provisioning a client device with an authentication cookie or an authentication token for enabling secure user access to a remotely located hardware device.

FIG. 4 is a flowchart illustrating the method steps involved in provisioning a client device (for example, any of client devices 202a, 202b, 202c or 202d) with an authentication cookie or an authentication token for enabling secure user access to a remotely located hardware device (for example, a software instance processing hardware system 304a, 304b or 304c). The method of FIG. 4 may be implemented at a client device based on prior data communication between the client device and an authentication server. The method of FIG. 4 may be used to provision the client device with an authentication cookie or an authentication token, to enable the client device to subsequently instantiate a communication session with a remotely located hardware system.

Step 402 comprises initiating a communication session between a client device and a remote server (i.e. a server that is located remotely from the client device and that is coupled through a communication network with the client device). The remote server may be configured to operate as an authentication server. In an embodiment, the client device may comprise any of client device 202a to 202d as illustrated in FIG. 2, and the remote server or authentication server may be integrated within or may be communicably coupled with a cloud services server system 206, 300 as illustrated in either FIG. 2 or FIG. 3.

Step 404 comprises sending user credentials from the client device to the remote server or authentication server—the user credentials comprising information that includes one or more identifiers corresponding either to the client device or to a user of the client device, or both.

Responsive to receiving the user credentials, the remote server or authentication server generates an authentication cookie or authentication token and associates said authentication cookie or authentication token with the client device or with the user of the client device. The remote server or authentication server may retrievably store (i) a copy of the authentication cookie/authentication token and/or (ii) data associating the authentication cookie/authentication token with the client device or with the user of the client device and/or (iii) data identifying the generated authentication token as representing pre-authorization for enabling the client device to remotely access one or more hardware devices. The authentication cookie/authentication token/data may be stored within a database of pre-authorized authentication tokens. The remote server or authentication server may transmit the authentication cookie/authentication token to the client device, and at step 406 the client device receives the transmitted authentication cookie/authentication token.

Step 408 comprises retrievably storing the authentication cookie/authentication token on the client device. In an embodiment, the authentication cookie/authentication token is stored within a memory or a data store or a data repository that is within, integrated with, or coupled to the client device. In a preferred embodiment, the memory, data store, or data repository is accessible by a web browser implemented on the client device.

FIG. 5 is a communication flow diagram illustrating communication flow between system entities involved in implementing the method of FIG. 4.

Step 5002 comprises initiating a communication session between client device 502 and authentication server 504.

At step 5004, client device 502 transmits user credentials to authentication server 504. The transmitted user credentials may comprise information that includes one or more identifiers corresponding either to the client device 502 or to a user of the client device 502, or both.

Responsive to receiving the user credentials, authentication server 504 generates an authentication cookie or authentication token. At step 5006, authentication server 504 stores in database 506, (i) a copy of the authentication cookie/authentication token and/or (ii) data associating the authentication cookie/authentication token with the client device or with the user of the client device and/or (iii) data identifying the generated authentication token as being pre-authorized for enabling remote access to one or more hardware devices. The authentication cookie/authentication token/data may be stored within a database of pre-authorized authentication tokens.

At step 5008, authentication server 504 transmits to client device 502, the generated authentication cookie or authentication token. The client device 502 thereafter retrievably stores the authentication cookie/authentication token in a memory, data store or data repository within the client device 502—for example, within a memory, data store or data repository that is accessible by a web browser implemented on the client device 502.

Figure 6:
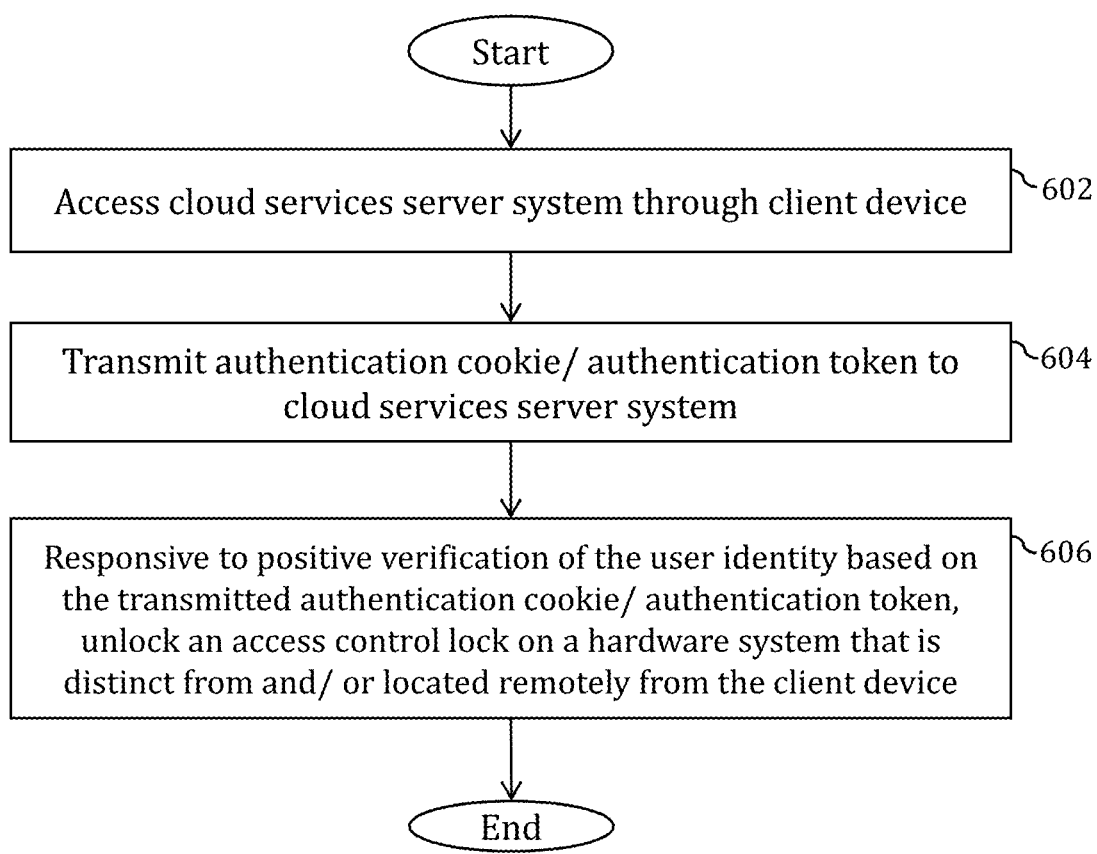
FIG. 6 is a flowchart illustrating a method of unlocking an access control lock on a remotely located hardware system based on verification of the authentication cookie or authentication token that has been provisioned within the client device.

FIG. 6 is a flowchart illustrating a method of unlocking an access control lock on a remotely located hardware system or hardware device based on verification of the authentication cookie or authentication token that has been provisioned within the client device. In a particular embodiment of the invention the client device is any of client device 202*a* to 202*d* of a kind described in connection with FIG. 2, while the remotely located hardware system is any software instance processing hardware system 304*a* to 304*c* of a kind described in connection with FIG. 3. In a preferred embodiment, the remotely located hardware system is any of a mobile communication device, or a processor based circuit board that is configured to implement the functionality of a mobile communication device, or any other data processor based system that is configured to implement the functionality of a mobile communication device.

Step 602 comprises accessing a cloud services server or a cloud services server system (e.g. cloud services server system 206, 300) through a client device (e.g. client devices 202*a*, 202*b*, 202*c* or 202*d*). In an embodiment, implementing step 602 may include first establishing network communication between the client device and the cloud services server (or cloud services server system), over a communication network. In an embodiment the cloud services server or cloud services server system is accessed through a web browser or internet browser implemented on the client device. In a specific embodiment, the cloud services server or cloud services server system is a cloud based gaming server or server system configured to enable cloud gaming services to be accessed by one or more client devices.

Step 604 comprises transmitting from the client device to the cloud services server or cloud services server system, an authentication cookie/authentication token ("client device authentication token") that has been retrieved from a memory or data store within or coupled with the client device. The transmitted authentication cookie/authentication token may have been previously provisioned within the client device in accordance with the methods of FIG. 4 or 5 as described above. In an embodiment, the authentication cookie/authentication token is automatically retrieved and transmitted to the cloud services server or cloud services server system in response to initiation/transmission of a request for access to a software streaming service or a cloud gaming service that is provided by the cloud services server or cloud services server system. In a further embodiment, the request for access to the software streaming service or cloud gaming service is initiated by a web browser, or internet browser or other software application on the client device.

The cloud services server or cloud services server system receives the transmitted authentication cookie/authentication token—and compares the received authentication cookie/authentication token with authentication token data stored in a database of pre-authorized authentication tokens that correspond to one or more client devices or users that are pre-authorized for remote access to a hardware device that is protected by an access control lock. In an embodiment, the hardware device to which the pre-authorized tokens correspond, is distinct from the client device.

The cloud services server or cloud services server system verifies the identity of the client device or a user operating the client device based on this comparison. In an embodiment, the cloud services server system may delegate or redirect the verification sub-process to an authentication server configured for authentication cookie/authentication token based identity verification. At step 606, responsive to positive verification of the identity of the client device or the identity of the user of the client device (i.e. responsive to a positive match between the received authentication cookie/authentication token and a pre-authorized authentication token within the database of pre-authorized authentication tokens), the cloud services server system unlocks or disables an access control lock on a hardware device or hardware system with which the matched pre-authorized token corresponds. In an embodiment, said hardware device or hardware system may comprise a part of a software instance processing layer within a cloud services server or cloud services server system. Responsive to unlocking or disabling the access control lock on the hardware device, the client device receives (or is provided with) over a communication network, one or more cloud based software services implemented by the hardware device.

In a preferred embodiment of step 606, responsive to positive verification (of the identity of the client device or the identity of the user of the client device) based on the transmitted authentication cookie/authentication token, the cloud services server system unlocks or disables an access control lock on a mobile communication device, or on a processor based circuit board that is configured to implement the functionality of a mobile communication device, or on a data processor based system that is configured to implement the functionality of a mobile communication device—wherein the mobile communication device, or processor based circuit board or data processor based system is distinct from and/or remotely located from the client device.

In a yet more specific embodiment, the access control lock is a screen lock on any of a mobile communication device, or on a data processor based system that is configured to implement the functionality of a mobile communication device, which device is distinct from and/or remotely located from the client device.

By implementing the method of FIG. 7, a user or client device is able to unlock access to (and functionality of) a remotely located mobile communication device (or other remotely located device that functions as a mobile communication device) without having to go through a conventional call-response challenge or other identity verification process.

FIG. 7 is a communication flow diagram illustrating communication flow between system entities for implementing a preferred embodiment of the method of FIG. 6.

Step 7002 comprises initiating a communication session between client device 702 and a client device interface layer 704 within a cloud services server system (e.g. cloud services server system 206, 300). In a specific embodiment, the cloud services server system is a cloud based gaming server system configured to enable cloud gaming services to be accessed by one or more client devices.

At step 7004, client device 702 transmits to the client device interface layer 704, an authentication cookie/authentication token that has been retrieved from a memory or data store within the client device 702. The transmitted authentication cookie/authentication token may have been previously provisioned within the client device in accordance with the methods of FIG. 4 or 5 as described above. In an embodiment, the authentication cookie/authentication token is automatically retrieved and transmitted to the cloud services server system in response to initiation/transmission of a request for access to a software streaming service or a cloud gaming service that is provided by the cloud services server system. In a further embodiment, the request for access to the software streaming service or cloud gaming service is initiated by a web browser, or internet browser or other software application on the client device.

The client device interface layer 704 matches or verifies the identity of the client device 702 or a user operating the client device 702 based on the transmitted authentication cookie/authentication token. In an embodiment, the client device interface layer 704 may delegate or redirect the verification sub-process to an authentication server configured for authentication cookie/authentication token based identity verification.

At step 7006, responsive to matching or positive verification (of the identity of the client device 702 or the identity of the user of the client device 702) based on the transmitted authentication cookie/authentication token, the client device interface layer 704 unlocks or disables an access control lock on mobile device hardware that is part of a software instance processing layer within the cloud services server system.

In a preferred embodiment of step 7006, responsive to positive verification (of the identity of the client device 702 or the identity of the user of the client device 704) based on the transmitted authentication cookie/authentication token, the client device interface layer 704 unlocks or disables an access control lock on a mobile communication device, or on a processor based circuit board that is configured to implement the functionality of a mobile communication device, or on a data processor based system that is configured to implement the functionality of a mobile communication device, which device 706 is distinct from and/or remotely located from the client device 702.

In a yet more specific embodiment, the access control lock is a screen lock on any of a mobile communication device, or on a data processor based system that is configured to implement the functionality of a mobile communication device, which device 706 is distinct from and/or remotely located from the client device 702.

Figure 9:
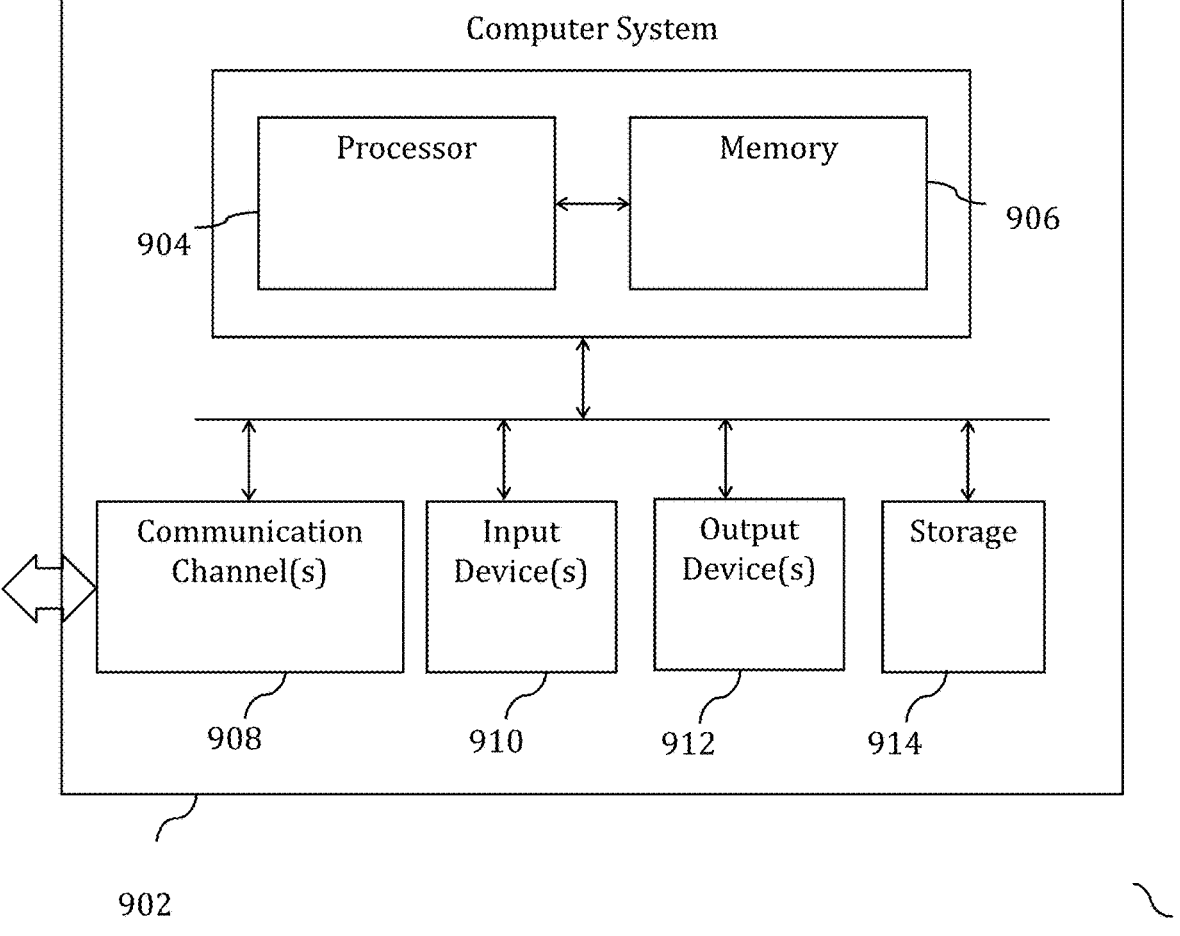
FIG. 9 illustrates an exemplary system for implementing the present invention.

FIG. 9 illustrates an exemplary system 900 for implementing the present invention. The illustrated system 900 comprises computer system 902 which in turn comprises one or more processors 904 and at least one memory 906. Processor 904 is configured to execute program instructions—and may be a real processor or a virtual processor. It will be understood that computer system 902 does not suggest any limitation as to scope of use or functionality of described embodiments. The computer system 902 may include, but is not be limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 902 in accordance with the present invention may include one or more servers, desktops, laptops, tablets, smart phones, mobile phones, mobile communication devices, tablets, phablets and personal digital assistants. In an embodiment of the present invention, the at least one memory 906 may store software for implementing various embodiments of the present invention. The computer system 902 may have additional components. For example, the computer system 902 may include one or more communication channels 908, one or more input devices 910, one or more output devices 912, and storage 914. An interconnection mechanism (not shown) such as a bus, controller, or network, interconnects the components of the computer system 902. In various embodiments of the present invention, operating system software (not shown) provides an operating environment for various softwares executing in the computer system 902 using a processor 904, and manages different functionalities of the components of the computer system 902.

The communication channel(s) 908 allow communication over a communication medium to various other computing entities. The communication medium provides information such as program instructions, or other data in a communication media. The communication media includes, but is not limited to, wired or wireless methodologies implemented with an electrical, optical, RF, infrared, acoustic, microwave, Bluetooth or other transmission media.

The input device(s) 910 may include, but is not limited to, a touch screen, a keyboard, mouse, pen, joystick, trackball, a voice device, a scanning device, or any another device that is capable of providing input to the computer system 902. In an embodiment of the present invention, the input device(s) 910 may be a sound card or similar device that accepts audio input in analog or digital form. The output device(s) 912 may include, but not be limited to, a user interface on CRT, LCD, LED display, or any other display associated with any of servers, desktops, laptops, tablets, smart phones, mobile phones, mobile communication devices, tablets, phablets and personal digital assistants, printer, speaker, CD/DVD writer, or any other device that provides output from the computer system 902.

The storage 914 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 902. In various embodiments of the present invention, the storage 914 may contain program instructions for implementing any of the described embodiments.

In an embodiment of the present invention, the computer system 902 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 902. The method described herein is typically implemented as a computer program product, comprising a set of program instructions that is executed by the computer system 902 or any other similar device. The set of program instructions may be a series of computer readable codes stored on a tangible medium, such as a computer readable storage medium (storage 914), for example, diskette, CD-ROM, ROM, flash drives or hard disk, or transmittable to the computer system 902, via a modem or other interface device, over either a tangible medium, including but not limited to optical or analogue communications channel(s) 908. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

The invention accordingly enables secure remote access through cross-device authentication, for implementation within cloud based service systems, and more particularly within cloud gaming systems.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims. Additionally, the invention illustratively disclose herein suitably may be practiced in the absence of any element which is not specifically disclosed herein—and in a particular embodiment specifically contemplated, is intended to be practiced in the absence of any element which is not specifically disclosed herein.

I claim:

1. A method for enabling secure remote hardware access through cross-device authentication, comprising:

establishing network communication between a client device and a remotely located cloud services server over a communication network;

receiving at the cloud services server, a client device authentication token transmitted from the client device, wherein the client device authentication token is retrieved from a memory within or coupled with the client device;

comparing at the cloud services server, the received client device authentication token with authentication token data stored in a database of pre-authorized authentication tokens;

responsive to a positive match between the received client device authentication token and a matching pre-authorized authentication token that is stored within the database of pre-authorized authentication tokens, wherein the matching pre-authorized authentication token is stored within said database with (i) data associating the matching pre-authorized authentication token with the client device or a user of the client device, and (ii) data identifying the matching pre-authorized authentication token as being pre-authorized for enabling remote access to a hardware device that is distinct from the client device, and that is protected by an access control lock:

unlocking the access control lock on the hardware device; and providing to the client device over the communication network, one or more cloud based software services implemented by the hardware device;

wherein unlocking the access control lock on the hardware device is performed solely responsive to the positive match of the client device authentication token at the cloud services server, without requiring any user credential entry, password, personal identification number ("PIN"), biometric input, or other user identity verification process being implemented on either the hardware device or the client device during the unlock operation.

2. The method as claimed in claim 1, wherein the client device authentication token has been provisioned in the memory within or coupled with the client device prior to the step of establishing network communication between the client device and the remotely located cloud services server, by implementing steps of:

receiving at a remote server, user credentials transmitted from the client device, wherein the user credentials comprises data that includes one or more identifiers corresponding to at least one of the client device or a user of the client device;

generating an authentication token and associating the authentication token with the client device or the user of the client device;

storing within the database of pre-authorized authentication tokens, the generated authentication token; and transmitting the generated authentication token to the client device for storage in the memory within or coupled with the client device.

3. The method as claimed in claim 2, further comprising the step of storing within the database of pre-authorized authentication tokens:

data associating the generated authentication token with the client device or with the user of the client device; or data identifying the generated authentication token as being pre-authorized for remote access to the hardware device.

4. The method as claimed in claim 1, wherein the client device authentication token is retrieved for transmission to the cloud services server, from the memory within or coupled with the client device, in response to initiation of a request for enabling the client device to access a software streaming service provided by the cloud services server.

5. The method as claimed in claim 1, wherein the hardware device is a mobile communication device, or a processor based circuit board that is configured to implement functionality of a mobile communication device, or a data processor based system that is configured to implement functionality of a mobile communication device, and wherein the mobile communication device, the processor based circuit board or the data processor based system is distinct from and remotely located from the client device.

6. The method as claimed in claim 1, wherein the access control lock is a screen lock on a mobile communication device, or on a data processor based system that is configured to implement functionality of a mobile communication device, and wherein the mobile communication device or the data processor based system is distinct from and remotely located from the client device.

7. A system for enabling secure remote hardware access through cross-device authentication, comprising a cloud services server comprising at least a processor and a memory, wherein the cloud services server is configured to:

establish network communication with a client device located remotely from the cloud services server;

receive a client device authentication token transmitted from the client device, wherein the client device authentication token is retrieved from a memory within or coupled with the client device;

compare at the cloud services server, the received client device authentication token with authentication token data stored in a database of pre-authorized authentication tokens;

responsive to a positive match between the received client device authentication token and a matching pre-authorized authentication token that is stored within the database of pre-authorized authentication tokens, wherein the matching pre-authorized authentication token is stored within said database with (i) data associating the matching pre-authorized authentication token with the client device or a user of the client device, and (ii) data identifying the matching pre-authorized authentication token as being pre-authorized for enabling remote access to a hardware device that is distinct from the client device, and that is protected by an access control lock:

unlocking the access control lock on the hardware device; and providing to the client device over the communication network, one or more cloud-based software services implemented by the hardware device;

wherein unlocking the access control lock on the hardware device is performed solely responsive to the positive match of the client device authentication token at the cloud services server, without requiring any user credential entry, password, personal identification number ("PIN"), biometric input, or other user identity verification process being implemented on either the hardware device or the client device during the unlock operation.

8. The system as claimed in claim 7, wherein the client device authentication token has been provisioned in the memory within or coupled with the client device by:

receiving at a remote server, user credentials transmitted from the client device, wherein the user credentials comprises data that includes one or more identifiers corresponding to at least one of the client device or a user of the client device;

generating an authentication token and associating the authentication token with the client device or the user of the client device;

storing within the database of pre-authorized authentication tokens, the generated authentication token; and transmitting the generated authentication token to the client device for storage in the memory within or coupled with the client device.

9. The system as claimed in claim 8, wherein the database of pre-authorized authentication tokens includes:

data associating the generated authentication token with the client device or with the user of the client device; or data identifying the generated authentication token as being pre-authorized for remote access to the hardware device.

10. The system as claimed in claim 7, wherein the client device authentication token is retrieved for transmission to the cloud services server, from the memory within or coupled with the client device, in response to initiation of a request for enabling the client device to access a software streaming service provided by the cloud services server.

11. The system as claimed in claim 7, wherein the hardware device is a mobile communication device, or a processor based circuit board that is configured to implement functionality of a mobile communication device, or a data processor based system that is configured to implement functionality of a mobile communication device, and wherein the mobile communication device, the processor based circuit board or the data processor based system is distinct from and remotely located from the client device.

12. The system as claimed in claim 1, wherein the access control lock is a screen lock on a mobile communication device, or on a data processor based system that is configured to implement functionality of a mobile communication device, and wherein the mobile communication device or the data processor based system is distinct from and remotely located from the client device.

13. A computer program product for enabling secure remote hardware access through cross-device authentication, comprising a non-transitory computer readable medium having a computer readable program code embodied therein, the computer readable program code comprising instructions for implementing steps of:

establishing network communication between a client device and a remotely located cloud services server over a communication network;

receiving at the cloud services server, a client device authentication token transmitted from the client device, wherein the client device authentication token is retrieved from a memory within or coupled with the client device;

comparing at the cloud services server, the received client device authentication token with authentication token data stored in a database of pre-authorized authentication tokens;

responsive to a positive match between the received client device authentication token and a matching pre-authorized authentication token that is stored within the database of pre-authorized authentication tokens, wherein the matching pre-authorized authentication token is stored within said database with (i) data associating the matching pre-authorized authentication token with the client device or a user of the client device, and (ii) data identifying the matching pre-authorized authentication token as being pre-authorized for enabling remote access to a hardware device that is distinct from the client device, and that is protected by an access control lock:

unlocking the access control lock on the hardware device; and providing to the client device over the communication network, one or more cloud-based software services implemented by the hardware device;

wherein unlocking the access control lock on the hardware device is performed solely responsive to the positive match of the client device authentication token at the cloud services server, without requiring any user credential entry, password, personal identification number ("PIN"), biometric input, or other user identity verification process being implemented on either the hardware device or the client device during the unlock operation.

* * * * *